US006862044B2

(12) United States Patent
Kariatsumari

(10) Patent No.: US 6,862,044 B2
(45) Date of Patent: Mar. 1, 2005

(54) DIGITAL BROADCAST RECEIVING APPARATUS FOR RESTORING AND SYNCHRONIZING SOUND AND IMAGE DATA AND CONTROL METHOD THEREOF

(75) Inventor: Takaki Kariatsumari, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 09/953,240

(22) Filed: Sep. 17, 2001

(65) Prior Publication Data

US 2002/0140859 A1 Oct. 3, 2002

(30) Foreign Application Priority Data

Mar. 27, 2001 (JP) ....................................... 2001-090773

(51) Int. Cl.[7] ................................................ H04N 9/475

(52) U.S. Cl. ........................ 348/515; 348/512; 348/738

(58) Field of Search ................................ 348/515, 512, 348/192, 184, 180, 705, 706, 738; 375/240.28; 709/248; 386/96, 97

(56) References Cited

U.S. PATENT DOCUMENTS 5,351,092 A * 9/1994 Poimboeuf et al. ......... 348/512
5,387,943 A * 2/1995 Silver ......................... 348/512
5,585,858 A * 12/1996 Harper et al. ............... 348/485
5,668,601 A * 9/1997 Okada et al. .......... 375/240.25
5,959,684 A * 9/1999 Tan et al. ................... 348/515
6,124,894 A * 9/2000 Greenwood et al. ........ 348/484
6,285,405 B1 * 9/2001 Binford et al. ............. 348/512

FOREIGN PATENT DOCUMENTS

| | | |
|---|---|---|
| JP | 6-343165 | 12/1994 |
| JP | 7-177479 | 7/1995 |
| JP | 9-247563 | 9/1997 |
| JP | 2001-24992 | 1/2001 |

* cited by examiner

*Primary Examiner*—Victor R. Kostak
(74) *Attorney, Agent, or Firm*—Pillsbury Winthrop LLP

(57) ABSTRACT

According to the present invention, a database is prepared on the basis of the type of processing performed on the image data and a delay amount generated in the image data. The delay amount corresponding to the type of processing performed on the image data is read from the database, and delay processing is performed on sound data on the basis of the read delay amount.

3 Claims, 3 Drawing Sheets

| | 480i | 480p | 720p | 1080i |
|---|---|---|---|---|
| Output terminal 18a | Delay amount A | — | — | — |
| Output terminal 18b | Delay amount B | — | — | — |
| Output terminal 18c | Delay amount C | Delay amount D | Delay amount E | Delay amount F |

DIGITAL BROADCAST RECEIVING APPARATUS FOR RESTORING AND SYNCHRONIZING SOUND AND IMAGE DATA AND CONTROL METHOD THEREOF

CROSS-REFERENCE TO RELATED APPLICATIONS

This application is based upon and claims the benefit of priority from the prior Japanese Patent Application No. 2001-090773, filed Mar. 21, 2001.

BACKGROUND OF THE INVENTION

1. Field of the Invention

The present invention relates to a digital broadcast receiving apparatus and a control method thereof, more specifically, relates to the improvement of the synchronization of the displayed image and the reproduced sound.

2. Description of the Related Art

As is well-known, in the above-mentioned digital television broadcast, digitized image data and sound data are broadcasted after they are respectively subjected to compression coding according to MPEG (Moving Picture Image Coding Experts Group), and then converted into the transport stream form.

The receiving apparatus executes MPEG decoding respectively for the received image data component and sound data component converted into the transport stream to obtain the original digital image data and sound data, thereafter convert them analog data for image and sound reproduction.

In the MPEG decoding process, the period of time required to MPEG decode the image data and that required for the sound data are different from each other due to the difference in the amounts of the two types of data. If the image and sound are displayed/reproduced directly after MPEG decoding, a time lag will occur between the displayed image and the reproduced sound due to this difference in data processing time.

In order to solve this problem, the synchronization of the displayed image and the reproduced sound, i.e. so-called lip-sync process, has been conventionally executed with use of a PTS (Presentation Time Stamp) contained in the image and sound data subjected to MPEG compression, as suggested in Jpn. Pat. Appln. KOKAI Publication No. 7-177479 or the like.

On the other hand, data processing and surround sound processing such as graphic processing or format conversion, for the image and sound data after MPEG decoding, are recently performed in accordance with the currently distributed multi-function receiving apparatuses.

The technique for synchronizing the displayed image and the reproduced sound with use of the PTS is, however, intended to do so by adjusting the time lag of the image and sound data after MPEG decoding.

Therefore, if various data processings are performed on the image and sound data after MPEG decoding and a time lag occurs thereby, the displayed image and the reproduced sound cannot be synchronized merely by use of PTS.

Other than the technique taught in the above-mentioned patent application, techniques of synchronizing the displayed image and the reproduced sound are suggested in Jpn. Pat. Appln. KOKAI Publication No. 6-343165 and Jpn. Pat. Appln. KOKAI Publication No. 9-247563.

However, the former technique is intended to attain lip-sync by adjusting the delay time of the image data with use of a flag added to the sound data as the head of the field such that the phases of the sound data and the image data are synchronized with each other. Similarly, the latter is intended to attain lip-sync by adjusting the period of the image reproduction time on the basis of the adjusted sound speed and the partition. As should be clear from the above, neither of the techniques relate to the above-mentioned problem or suggest any solution thereto.

BRIEF SUMMARY OF THE INVENTION

The present invention is made in consideration of the above-mentioned problem, and intends to provide a digital broadcast receiving apparatus capable of synchronizing a displayed image and a reproduced sound with ease even in a state where the image data and the sound data are arbitrarily subjected to various digital data processings, and a control method thereof.

The digital broadcast receiving apparatus according to the present invention is intended to restore image data and sound data from a received digital broadcast and synchronize the image data and the sound data.

The digital broadcast receiving apparatus according to the present invention comprises a storage section for storing a database prepared such that the data processing performed an the image data corresponds to delay amounts generated in the image data during data processing, and a delay processing section for reading one of the delay amounts corresponding to the selected kind of data processing performed on the image data, and performing delay processing for the sound data in accordance with the read one of the delay amounts.

A control method according to the present invention is intended to control a digital broadcast receiving apparatus for restoring image data and sound data from a received digital broadcast such that the image data and the sound data are synchronized.

According to the control method of the present invention, one of the delay amounts generated in the image data during data processing performed for the image data is read from a database prepared such that the data processing corresponds to the delay amounts, so as to allow the delay amount to correspond to a selected data processing, and delay processing is performed for the sound data in accordance with the read one of the delay amounts.

According to the structure and method as mentioned above, a database of the delay amount generated in the image data is prepared for each of the data processings performed on the image data, and the sound data is delayed on the basis of the delay amount corresponding to each of the data processings performed on the image data. With this method, the displayed image and the reproduced sound can be synchronized with ease even in the case where various digital data processings are arbitrarily performed on the image data.

Additional objects and advantages of the invention will be cot forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part at the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be explained in detail with reference to the accompanying drawings.

Figure 1:
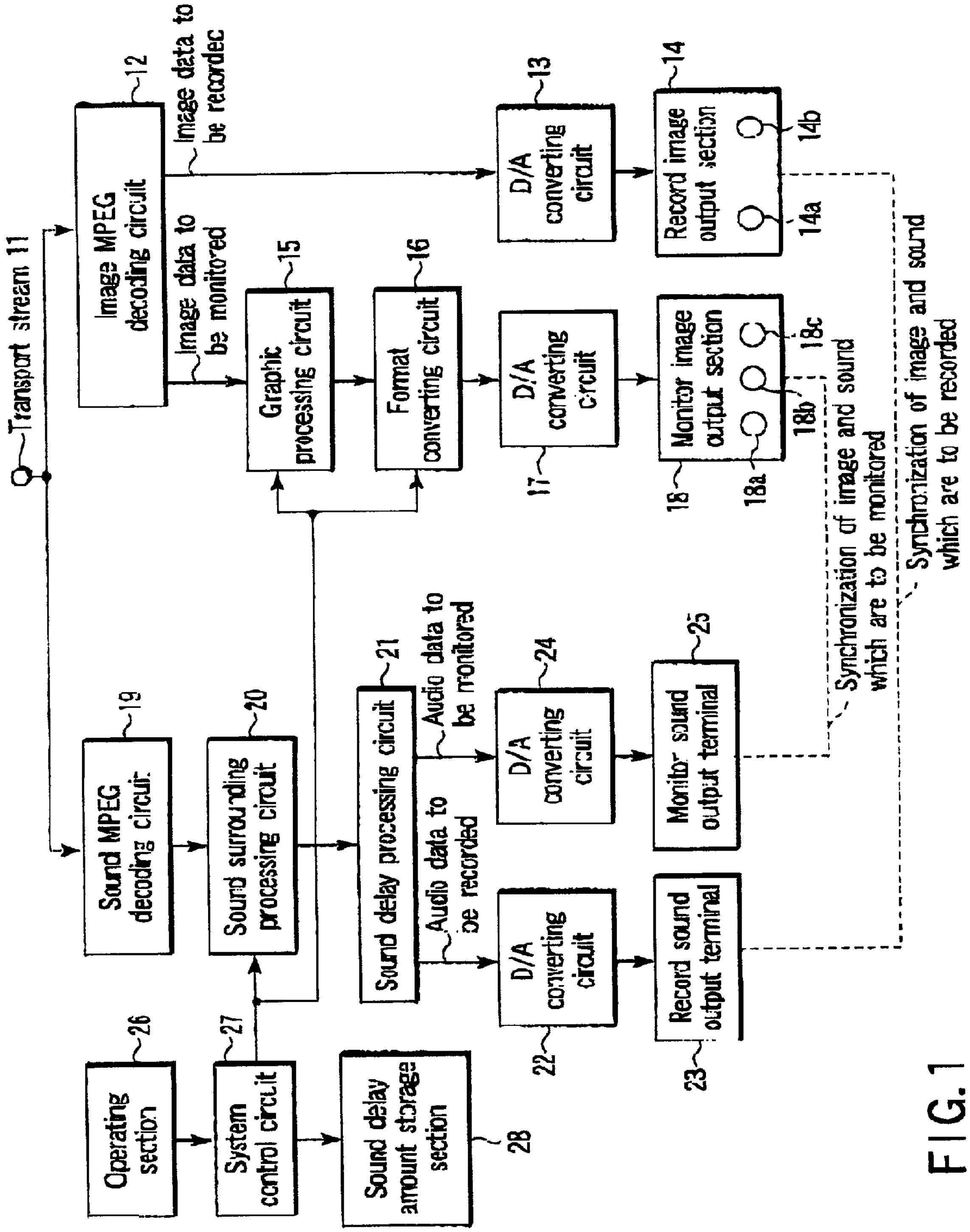
FIG. 1 is a block configuration diagram for explaining a digital television receiving apparatus according to an embodiment of the present invention.

FIG. 1 is a block diagram for explaining a digital television receiving apparatus according to an embodiment of the present invention. In this diagram, 11 denotes an input terminal to which a transport stream of a channel selected among the received digital television broadcast is supplied.

The image data component of the transport stream supplied to the input terminal 11 is supplied to an MPEG decoding circuit 12 to be decoded, and then output as image data to be recorded and image data to be monitored.

The image data to be recorded is supplied to a D/A (Digital/Analog) convertor 13 to be converted into analog, and output through a record image output section 14. The record image output section 14 has a normal record image output terminal **14*a* for outputting a luminance signal and a color signal mixed together, and an S record image output terminal 14*b*** for outputting a luminance signal and a color signal separately.

The image data to be monitored is supplied to a graphic processing circuit 15 to be added with data such as OSD (On Screen Display) data for displaying icons and so on, then sent to a format converting circuit 16 such that the format thereof is converted.

The format converting circuit 16 converts the input image data into one of the formats **480*i* (interace), 480*p* (progressive), 720*p* and 1080*i*.**

The image data subjected to format conversion in the format converting circuit 16 is supplied to a D/A convertor 17 to be converted into analog, and output through a monitor image output section 18.

The monitor image output section 18 has a normal output terminal **18*a* for outputting a luminance signal and a color signal mixed together, an S output terminal 18*b* for outputting a luminance signal and a color signal separately, a D output terminal 18*c*** for outputting a brightness signal and a chromatic signal separately.

On the other hand, the sound data component of the transport stream supplied to the input terminal is supplied to MPEG decoding circuit 19 to be decoded, and then output to a surround sound processing circuit 20 to be subjected to a surround sound process.

The sound data output from the surround sound processing circuit 20 is sent to a sound delay processing circuit 21 to be subjected to delay processing, then divided into sound data to be recorded and sound data to be monitored, then output.

The sound data to be recorded is supplied to a D/A convertor 22 to be converted into analog, and output through a record sound output terminal 23. The sound data to be monitored is supplied to a D/A convertor 24 to be converted into analog, and output through a monitor sound output terminal 25.

The graphic processing circuit 15, the format converting circuit 16, and the sound surrounding processing circuit 20 are controlled by a system control circuit 27 to which operating information input by the user from a operating section 26 is supplied, such that the input image and sound data are respectively subjected to a predetermined data processing.

The system control circuit 27 reads from a database stored in a sound delay amount storage section 28 delay amount information on the basis of the data processings performed on the image data in the graphic processing circuit 15 and the format converting circuit 16, and controls the delay amount to be added to the sound data by the sound delay processing circuit 21 in accordance with the delay amount information.

The synchronization of the image data output from the output terminals **14*a* and 14*b* of the record image output section 14 and the sound data output from the record sound output terminal 23** will be described next.

Prior to this synchronization process, the record image data output from the image MPEG decoding circuit 12 is sent directly to the D/A converting circuit 13 through no data processing, then supplied to the record image output section 14.

The sound delay processing circuit 21 thus delays the sound data on the basis of the pre-set delay amount in accordance with the above-mentioned image data path, thereby the synchronization between the image data output from the output terminals **14*a* and 14*b* of the record image output section 14 and the sound data output from the record sound output terminal 23** is attained.

Next, synchronization of the image data output from the output terminals **18*a*, 18*b*, and 18*c* of the monitor image output section 18 and the sound data output from the monitor sound output terminal 25** will be described below.

The monitor image data output from the image MPEG decoding circuit 12 is sent to the graphic processing circuit 15 and the format converting circuit 16 so as to be subjected to data processing. The period of time required for the data processing depends on the type of processing. In particular, the data amount processed by the format converting circuit 16 is rather large compared with that processed by other sections, and thus greatly influences the delay time of the image data.

Figures 2, 4:
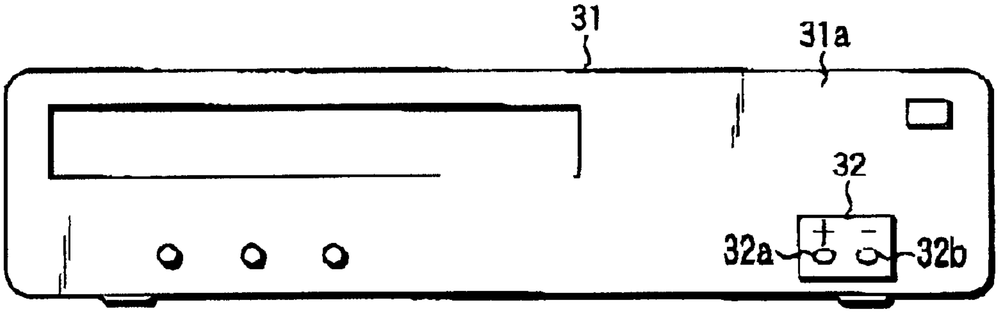
FIG. 2 is a table representing a database of a sound delay amount storage section in the embodiment.
FIG. 4 in a front view of the receiving apparatus, for explaining a delay amount manual setting operation section in the modification.

In consideration of the difference in the image data processing time, the sound delay amount storage section 28 is provided with the database us represented in the table of FIG. 2. The database stores delay amounts A to F respectively determined corresponding to the combinations of the formats **480*i*, 480*p*, 720*p* and 1080*i* to which the image data is converted, and the output terminals 18*a*, 18*b*, and 18*c*** from which the image data is output. The image data respectively has the delay amounts A to F in accordance with the data processing performed thereto and the output terminal outputting the image data.

The delay amounts A to F are the periods of time required for the data processings in the image MPEG decoding circuit 12, the graphic processing circuit 15, the format converting circuit 16, the sound MPEG decoding circuit 19, the sound surrounding processing circuit 20, and so on, which are obtained in advance by calculation and measurement.

According to this database, when the monitor image data output from the image MPEG decoding circuit 12 is set to be converted into the format 480*i* and output from the D monitor image output terminal 18*c*, for example, it is found that the image data has the delay amount C.

The system control circuit 27 reads one of the delay amounts A to F from the database of the sound delay amount storage section 28 on the basis of the operation information output from the operating section 26, i.e., on the basis of the information which one of the formats 480*i*, 480*p*, 720*p* and 1080*i* the image data is converted into, and which one of the output terminals 18*a*, 18*b*, and 18*c* the image data is output from. The system control circuit 27 then sets the read delay amount in the sound delay processing circuit 21.

The sound delay processing circuit 21 receiving the instruction from the system control circuit 27 conducts the delay processing for the sound data in accordance with the set one of the delay amounts A to F. In this manner, the image data output from the output terminals 18*a*, 18*b*, and 18*c* can be synchronized with the sound data output from the monitor sound output terminal 25.

According to the embodiment mentioned above, the database of the delay amounts A to F generated in the image data is prepared with use of the formats 480*i*, 480*p*, 720*p* and 1080*i* and the output terminals 18*a*, 18*b*, and 18*c* as parameters, and the delay amount corresponding to the combination of a selected one of the formats and selected one of the output terminals is read from the databases and the sound data is delayed by the read delay amount. With this method, the display image can be easily synchronized with the sound data.

Figure 3:
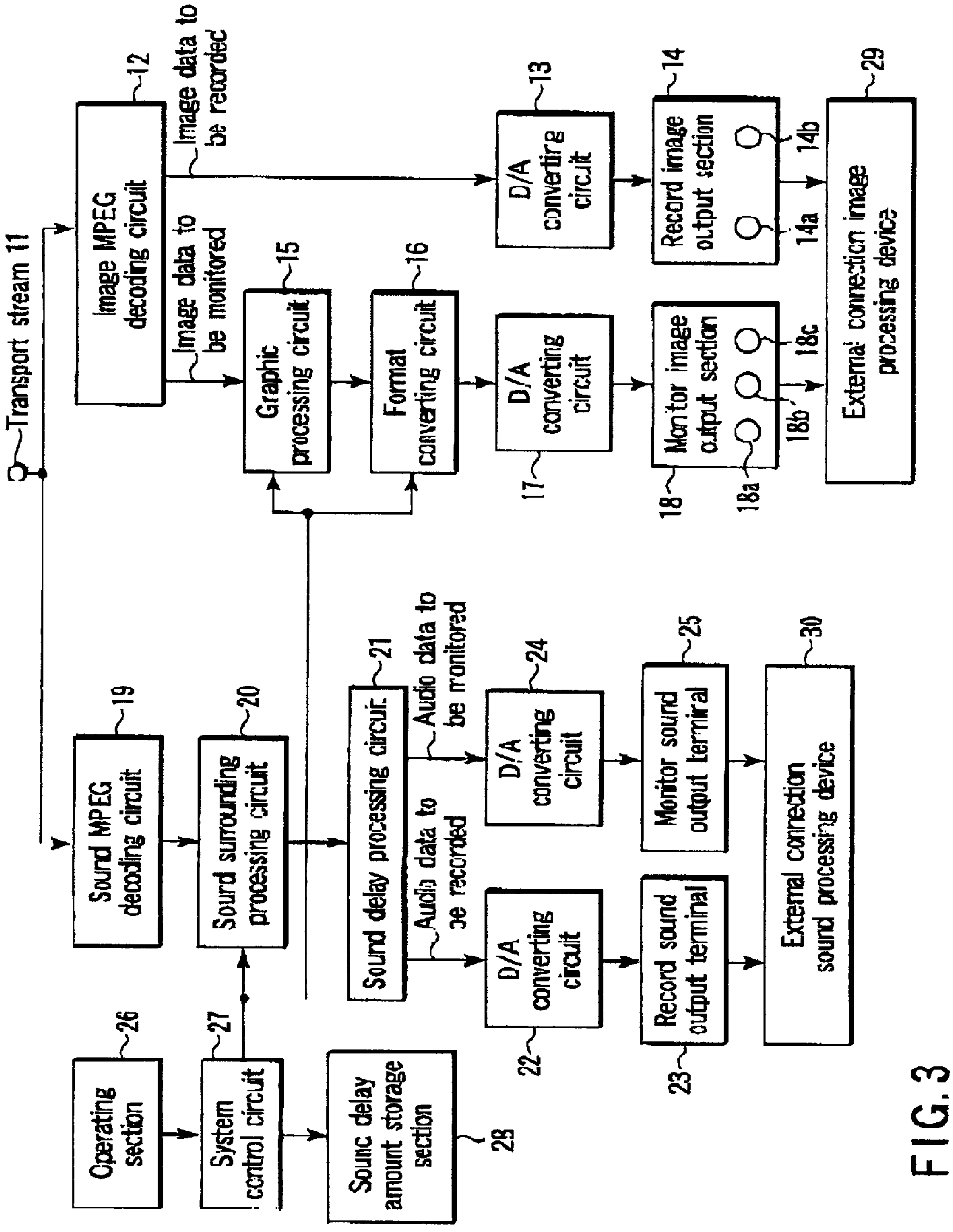
FIG. 3 is A block diagram for explaining a digital television receiving apparatus according to a modification of an embodiment of the present invention, wherein the delay amount is manually set.

FIG. 3 shows a modification of the above-mentioned embodiment, and the same portions shown in the diagram of FIG. 1 are denoted by the same reference numerals. In this modification, there is proposed the case where the user manually conducts a specific signal processing for the analog image signal output from the record image output section 14 or the monitor image output section 18 with use of an external connection image processing device 29, and the came where the user manually conducts a specific signal processing for the analog sound signal output from the record sound output section 23 or the monitor sound output section 25 with use of an external connection sound processing device 30.

In such a manual setting, the delay times of the analog image signal and the analog sound signal depend on the type of external connection sound processing devices 29 and 30 connected to the apparatus, and thus the delay amount cannot be determined in advance.

In order to set a suitable delay amount, the operating section 26 is provided with an operating member for manually setting the delay amount by which a predetermined unit delay amount $\alpha$ is added to or subtracted from one of the delay amounts A to F selected from the database stored in the sound delay amount storage section 28, and the obtained value is supplied to the sound delay processing circuit 21.

Taking an example of the operating member mentioned above, a front panel 31*a* of a digital television broadcast receiving apparatus 31 as shown in FIG. 4 is provided with a delay amount manual setting operating section 32 in which a delay amount adding push key (+) 32*a* and a delay amount subtracting push key (−) 32*b* are installed.

With use of the above-mentioned structure, when the system control circuit 27 selects the delay amount C from the database stored in the sound delay amount storage section 28, the delay amount adding push key (+) 32*a* is pushed down once, and the delay amount $C+\alpha$ is supplied to the sound delay processing circuit 21, and the delay amount adding push key (+) 32*a* is pushed down once more, and the delay amount $C+2\alpha$ is supplied to the sound delay processing circuit 21. In this manner, the delay amount can be increased by the unit delay amount $\alpha$ by adding it to the base delay amount C.

In contrary thereto, when the system control circuit 27 selects the delay amount C from the database stored in the sound delay amount storage section 28, the delay amount subtracting push key (−) 32*b* is pushed down once, and the delay amount $C-\alpha$ is supplied to the sound delay processing circuit 21, and the delay amount subtracting push key (−) 32*b* is push downed once more, and the delay amount $C-2\alpha$, is supplied to the sound delay processing circuit 21. In this manner, the delay amount can be decreased by the unit delay amount $\alpha$ by subtracting it from the base delay amount C.

As described above, the user can control the reproduced sound to attain lip-sync whilst watching the displayed image, by manually changing the delay amount of the sound data even in the case where a specific signal processing is performed for the analog image signal and the analog sound signal with use of the external connection image processing device 29 and the external connection sound processing device 30.

The delay amount adding push key (+) 32*a* can be set so that the longer the push key is pushed down, the more the delay amount is increased serially, i.e., $+\alpha$, $+2\alpha$, $+3\alpha$, . . . . Similarly, the delay amount subtracting push key (−) 32*b* can be set so that the longer the push key is pushed down, the less the delay amount is decreases serially, i.e., $-\alpha$, $-2\alpha$, $-3\alpha$, . . . .

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital broadcast receiving apparatus for restoring image data and sound data from a received digital broadcast and for synchronizing a reproduced sound based on the sound data and a displayed image based on the image data for which a predetermined data processing is executed, said digital broadcast receiving apparatus comprising:

storage means for storing a database that represents correlations between data processing performed for the image data and delay amounts, the correlations being based on image data formats including 480 interlaced format, 480 progressive format, 720 progressive format and 1080 interlaced format and on output terminal types including a standard monitor image output terminal, an S monitor image output terminal, and a D monitor image output terminal; and delaying means for reading one of the delay amounts from the database stored in the storing means and for performing delay processing for the sound data based on the read delay amount, wherein the read delay amount corresponds to the selected data processing performed on the image data.

2. A digital broadcast receiving apparatus that restores image data and sound data from a received digital broadcast and synchronizes a reproduced sound based on the sound data and a displayed image based on the image data for which a predetermined data processing is executed, said digital broadcast receiving apparatus comprising:

a storage section that stores a database representing correlations between data processing performed for the image data and delay amounts, the correlations being based on image data formats including 480 interlaced format, 480 progressive format, 720 progressive format and 1080 interlaced format and on output terminal types including a standard monitor image output terminal, an S monitor image output terminal, and a D monitor image output terminal; and a delay processing section configured to read one of the delay amounts from the database stored in the storage section and to perform delay processing for the sound data based on the read delay amount, wherein the read delay amount corresponds to the selected data processing performed on the image data.

3. A method of controlling a digital broadcast receiving apparatus that restores image data and sound data from a received digital broadcast and synchronizes a reproduced sound based on the sound data and a displayed image based on the image data for which a predetermined data processing is executed, said method comprising:

storing a database representing correlations between data processing performed on the image data and delay amounts, the correlations being based on image data formats including 480 interlaced format, 480 progressive format, 720 progressive format and 1080 interlaced format and on output terminal types including a standard monitor image output terminal, an S monitor image output terminal, and a D monitor image output terminal;

reading one of the delay amounts from the database, the read delay amount corresponding to the selected data processing performed on the image data; and performing delay processing for the sound data based on the read delay amount.

* * * * *